(12) United States Patent
Blanchard et al.

(10) Patent No.: US 11,040,496 B2
(45) Date of Patent: Jun. 22, 2021

(54) METHODS AND SYSTEMS FOR REPAIRING COMPOSITE STRUCTURES

(71) Applicant: THE BOEING COMPANY, Chicago, IL (US)

(72) Inventors: Steven Donald Blanchard, Issaquah, WA (US); Gary D. Oakes, Renton, WA (US); Arne K. Lewis, Auburn, WA (US)

(73) Assignee: The Boeing Company, Chicago, IL (US)

(*) Notice: Subject to any disclaimer, the term of this patent is extended or adjusted under 35 U.S.C. 154(b) by 92 days.

(21) Appl. No.: 15/847,294

(22) Filed: Dec. 19, 2017

(65) Prior Publication Data
US 2019/0184652 A1 Jun. 20, 2019

(51) Int. Cl.
| | |
|---|---|
| B29C 65/00 | (2006.01) |
| B29C 70/44 | (2006.01) |
| B32B 37/10 | (2006.01) |
| B29D 99/00 | (2010.01) |
| B29C 73/10 | (2006.01) |
| B29C 73/30 | (2006.01) |
| B29L 31/30 | (2006.01) |
| B29C 65/18 | (2006.01) |

(52) U.S. Cl.
CPC ...... *B29C 66/81455* (2013.01); *B29C 70/443* (2013.01); *B29C 73/10* (2013.01); *B29C 73/30* (2013.01); *B29D 99/0014* (2013.01); *B32B 37/10* (2013.01); *B29C 65/18* (2013.01); *B29C 66/1122* (2013.01); *B29C 66/5326* (2013.01); *B29C 66/71* (2013.01); *B29C 66/721* (2013.01); *B29C 66/7212* (2013.01); *B29C 66/73941* (2013.01); *B29L 2031/3076* (2013.01); *B29L 2031/3082* (2013.01); *B29L 2031/3085* (2013.01)

(58) Field of Classification Search
CPC .. B29C 70/44; B30B 5/02; B30B 9/22; B32B 37/10; B32B 37/1009
See application file for complete search history.

(56) References Cited

U.S. PATENT DOCUMENTS

| | | | |
|---|---|---|---|
| 4,816,106 A * | 3/1989 | Turris | B29C 43/3642 156/285 |
| 5,236,646 A | 8/1993 | Cochran et al. | |

(Continued)

OTHER PUBLICATIONS

Extended European Search Report regarding European Patent Application Serial No. 18201042.1-1019 dated May 13, 2019, pp. 1-7.

*Primary Examiner* — Christopher T Schatz
(74) *Attorney, Agent, or Firm* — Armstrong Teasdale LLP

(57) ABSTRACT

A method of bonding composite structures includes positioning a second structure at a bonding site on a first structure and coupling a first vacuum bag to the first structure such that the first vacuum bag covers the bonding site. The method also includes applying a vacuum to the first vacuum bag to induce a first mechanical force to the second structure via the first vacuum bag. A second vacuum bag is coupled to the first structure such that second vacuum bag covers the second structure and at least a portion of the first vacuum bag. The method further includes applying a vacuum to the second vacuum bag to induce a second mechanical force to the second structure via the second vacuum bag.

20 Claims, 3 Drawing Sheets

(56) References Cited

U.S. PATENT DOCUMENTS

| | | |
|---|---|---|
| 6,761,783 B2 | 7/2004 | Keller et al. |
| 7,413,694 B2 | 8/2008 | Waldrop et al. |
| 7,935,200 B1 | 5/2011 | Keller et al. |
| 8,851,879 B2 | 10/2014 | Waldrop et al. |
| 2005/0253309 A1 | 11/2005 | Hou et al. |
| 2015/0158258 A1 | 6/2015 | Nelson et al. |
| 2017/0129232 A1 | 5/2017 | Burd et al. |
| 2017/0341320 A1 | 11/2017 | McKibbin |

* cited by examiner

METHODS AND SYSTEMS FOR REPAIRING COMPOSITE STRUCTURES

BACKGROUND

The field of the disclosure relates to systems and methods for bonding structures comprised of composite materials, and in particular, to methods and systems for performing such bonding out of autoclave.

The use of structures comprised of composite materials has grown in popularity, particularly in such applications as aircraft airframes, where benefits include increased strength and rigidity, reduced weight and reduced parts count. When damaged, however, composite structures often require extensive repair work which may ground an aircraft, thereby adding to the support costs of the aircraft. Current maintenance procedures frequently require that the damaged component be removed and replaced before the aircraft can resume flying.

At least some known repair and bonding methods employ the use of a vacuum bag to apply atmospheric pressure to provide intimate contact during the curing process. As the epoxy between the composite plies cures, the epoxy emits volatile organic compounds. Under a vacuum this outgassing increases due to the low vapor pressure under the vacuum bag. In addition, any resident moisture in the parent composite structure, the aircraft, also vaporizes. Such outgassing may result in unacceptable levels of porosity being trapped in the cured composite plies and/or the adhesive bond line. If too much porosity occurs, the cured composite may be structurally unacceptable. Repair technicians must then physically remove all of the affected plies by grinding them off and beginning the bonding process from the start. This may take a few hours or a few days depending on the complexity and size of the part.

At least some known repair and bonding methods cure parts under pressure in an autoclave to keep the volatiles in solution during the curing of epoxy resins and thus prevent porosity in the composite parts. However, autoclaves are expensive to purchase and operate, and they are limited in size. Similarly, autoclaves are rarely used for performing bonded repairs to composite structure or parts.

BRIEF DESCRIPTION

In one aspect, a method of bonding a structure is provided. The method includes positioning a second structure at a bonding site on a first structure and coupling a first vacuum bag to the first structure such that the first vacuum bag covers the bonding site. The method also includes applying a vacuum to the first vacuum bag to induce a first mechanical force to the second structure via the first vacuum bag. A second vacuum bag is coupled to the first structure such that second vacuum bag covers the second structure and at least a portion of the first vacuum bag. The method further includes applying a vacuum to the second vacuum bag to induce a second mechanical force to the second structure via the second vacuum bag.

In another aspect, a composite structure bonding system is provided. The composite structure bonding system includes a first structure including a bonding site and a second structure configured to couple to the first structure at the bonding site. The composite structure bonding system also includes a first vacuum bag coupled to the first structure. The first vacuum bag is configured to apply a first mechanical force to the second structure when a vacuum is applied to the first vacuum bag. The composite structure bonding system further includes a second vacuum bag coupled to the first structure such that the second vacuum bag covers the second structure. The second vacuum bag is configured to apply a second mechanical force to the second structure when a vacuum is applied to the second vacuum bag.

The features, functions, and advantages that have been discussed can be achieved independently in various embodiments or may be combined in yet other embodiments further details of which can be seen with reference to the following description and drawings.

DETAILED DESCRIPTION

The implementations described herein include methods and systems for joining composite structures. The method includes positioning a second structure at a bonding site on a first structure and coupling a first vacuum bag to the first structure such that the first vacuum bag covers the bonding site. The method also includes applying a vacuum to the first vacuum bag to induce a first mechanical force to the second structure via the first vacuum bag. A second vacuum bag is coupled to the first structure such that second vacuum bag covers the second structure and at least a portion of the first vacuum bag. The method further includes applying a vacuum to the second vacuum bag to induce a second mechanical force to the second structure via the second vacuum bag. After both the mechanical forces are applied to the second structure concurrently, the first vacuum bag is at least partially vented to remove or reduce the first mechanical force from the first vacuum bag on the second structure and to expose the second structure to atmospheric pressure. The vacuum is maintained on the second vacuum bag to maintain the second mechanical force on the second structure while still exposing the second structure to substantially atmospheric pressure within the first volume. By exposing the second structure to atmospheric pressure during curing and maintaining the compaction force provided by the second vacuum bag, the volatile organic compounds formed during curing within at least the second structure are kept in solution and are able to be removed from the second structure without vaporizing, thus preventing porosity within the second structure.

The composite structure bonding system described herein is used to repair a damaged structure or in a secondary bonding process to join two composite structures together. The system allows the use of atmospheric compaction pressure without the problems associated with low vapor pressure in traditional vacuum bag cures. More specifically, the composite structure bonding system described herein allows mechanical pressure to be applied to the composite structures without exposing them to low vapor pressure. As such, porosity within the composite structures is significantly reduced or prevented, thus increasing or maintaining the structural integrity of the composite structures. Additionally, the composite structure bonding system described herein is designed to produce partially cured or fully cured autoclave-quality hot-bond composite repairs on a first structure without the use of an autoclave. As such, the composite structure bonding system described herein results in joining of composite structures having any size and shape in a shortened time span and at a reduced cost as compared to known methods.

Figure 1:
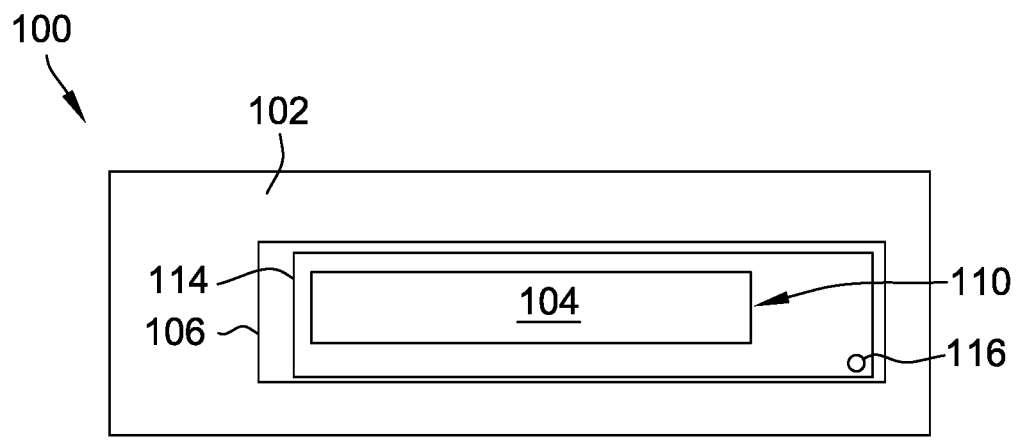
FIG. 1 is a top view of an exemplary composite structure bonding system illustrating a first structure, a second structure, and a first vacuum bag.
Figure 2:
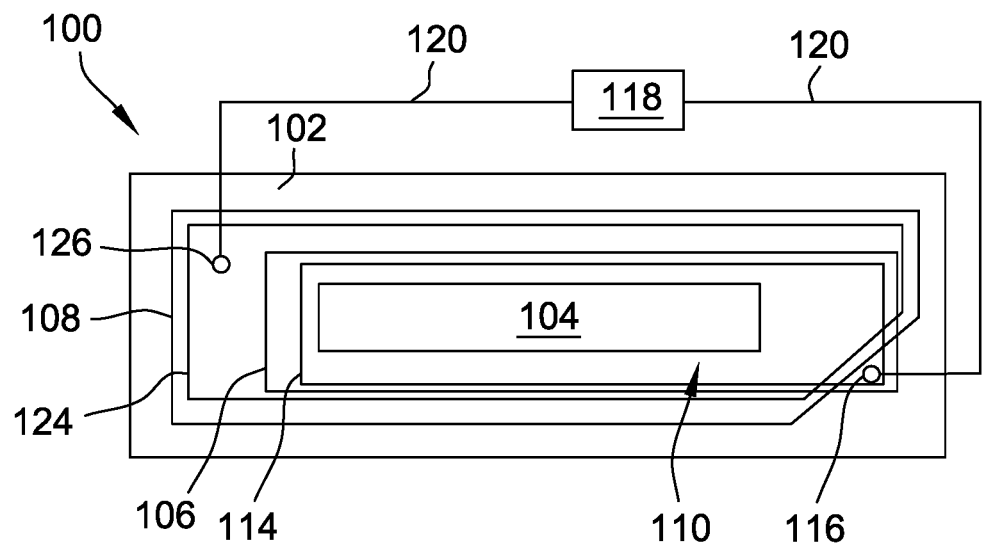
FIG. 2 is a top view of the composite structure bonding system shown in FIG. 1 further illustrating a second vacuum bag.
Figure 3:
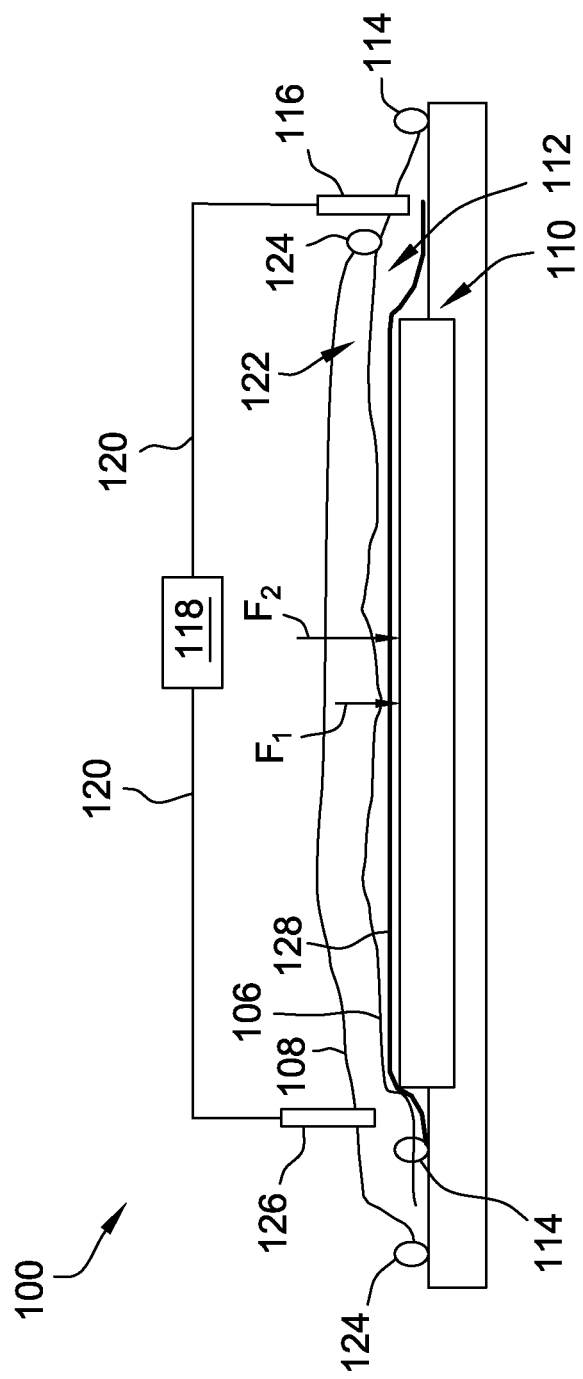
FIG. 3 is a cross-section side view of the composite structure bonding system shown in FIG. 2.

FIG. 1 is a top view of an exemplary composite structure bonding system 100 illustrating a parent structure or first structure 102, a repair structure or second structure 104, and a first vacuum bag 106. FIG. 2 is a top view of composite structure bonding system 100 further illustrating a second vacuum bag 108. FIG. 3 is a cross-section side view of composite structure bonding system 100.

In the exemplary embodiment, first structure 102 is a component of an aircraft. For example, first structure 102 is any of an aircraft fuselage, wing, or empennage. Furthermore, in the exemplary embodiment, first structure 102 is formed from a composite material (e.g., carbon or boron fibers embedded in epoxy resin) having a plurality of plies and includes a bonding site 110 that requires repair. As described herein, the repair will be made using second structure 104 positioned on first structure 102 at bonding site 110. Similar to first structure 102, second structure 104 is also formed from a composite material that will be compacted, debulked, and fully cured in situ. As described herein, composite structure bonding system 100 may be used as a repair system for repairing a damaged composite structure. Additionally, composite structure bonding system 100 may be used for secondary bonding of two pre-cured composite structures.

Referring to FIGS. 1-3, composite structure bonding system 100 includes first vacuum bag 106 coupled to first structure 102 such that first vacuum bag 106 covers an entirety of second structure 104 and bonding site 110. More specifically, first vacuum bag 106 is coupled to first structure 102 such that a first volume 112 (shown in FIG. 3) is defined by first vacuum bag 106 and first structure 102. As described herein, second structure 104 is contained within the first volume 112. The perimeter of first vacuum bag 106 is sealed to first structure 102 by a first sealing mechanism 114, which surrounds second structure 104 and bonding site 110. Furthermore, in the exemplary embodiment, composite structure bonding system 100 includes a first probe 116 coupled to first vacuum bag 106. First probe 116 passes through an opening in first vacuum bag 106 and selectively couples first volume 112 of first vacuum bag 106 in flow communication with a vacuum source 118 via a hose 120.

In the exemplary embodiment, composite structure bonding system 100 also includes second vacuum bag 108 coupled to first structure 102 such that second vacuum bag 108 covers an entirety of second structure 104 and bonding site 110 and at least a portion of first vacuum bag 106. More specifically, second vacuum bag 108 is coupled to first structure 102 such that a second volume 122 (shown in FIG. 3) is defined by second vacuum bag 108, first structure 102, and first vacuum bag 106. As described herein, second vacuum bag 108, and therefore second volume 122, covers an entirety of second structure. However, while second volume 122 overlaps second structure 104, second structure 104 is positioned outside second volume 122 between first vacuum bag 106 and first structure 102. More specifically, second structure 104 is separated from second volume 122 by first vacuum bag 106.

The perimeter of second vacuum bag 108 is sealed to first structure 102 by a second sealing mechanism 124, which surrounds second structure 104 and bonding site 110. As best shown in FIGS. 2 and 3, second sealing mechanism 124 extends partially across first vacuum bag 106 such that a portion of first vacuum bag 106 is left uncovered by second vacuum bag 108. More specifically, the portion of first vacuum bag 106 left uncovered by second vacuum bag 108 includes first probe 116 such that first probe 116 is positioned outside second volume 122 when second vacuum bag 108 is coupled to first structure 102 and first vacuum bag 106.

Furthermore, in the exemplary embodiment, composite structure bonding system 100 includes a second probe 126 coupled to second vacuum bag 108. Second probe 126 passes through an opening in second vacuum bag 108 and selectively couples second volume 122 of second vacuum bag 108 in flow communication with vacuum source 118 via hose 120. Optionally, a heating blanket 128 is positioned between first vacuum bag 106 and second structure 104 to provide heat to first structure 102 and second structure 104 during curing. In situations where composite structure bonding system 100 is used during a secondary bonding process, structures 102 and 104 and vacuum bags 106 and 108 may be positioned inside an oven to provide heating.

In operation, first probe 116 is coupled to vacuum source 118 and facilitates applying a vacuum to first vacuum bag 106 to remove the air from first volume 112. In such a configuration, first vacuum bag 106 induces a first mechanical force F1 on second structure 104 when a vacuum is applied to first vacuum bag 106. More specifically, because first vacuum bag 106 completely covers second structure 104, first vacuum bag 106 applies the first mechanical force F1 to an entire area of second structure 104, that is, first vacuum bag 106 conforms to the shape of second structure 104 to apply the first mechanical force F1 to an entire area of second structure 104. In the exemplary embodiment, the first mechanical force F1 is a compression or compaction force that presses second structure 104 down onto first structure 102 to prevent porosity, and therefore expansion, of second structure 104. Although FIG. 3 illustrates a gap between first vacuum bag 106 and second structure 104, this is for illustration purposes only and, in operation, first vacuum bag 106 directly contacts second structure 106 (or indirectly via optional heating blanket 128) to apply the first mechanical force F1.

Similarly, second probe 126 is coupled to vacuum source 118 and facilitates applying a vacuum to second vacuum bag 108 to remove the air from second volume 122. As described herein, the vacuum is applied to second vacuum bag 108 while first vacuum bag 106 is also under vacuum. In such a configuration, second vacuum bag 108 induces a second mechanical force F2 on second structure 104 when a vacuum is applied to second vacuum bag 108. More specifically, because second vacuum bag 108 completely covers second structure 104 and covers a majority of first vacuum bag 106, second vacuum bag 108 applies the second mechanical force F2 to first vacuum bag 106 and to an entire area of second structure 104, that is, second vacuum bag 108 conforms to the shape of second structure 104 to apply the second mechanical force F2 to an entire area of second structure 104. Similar to first mechanical force F1, the second mechanical force F2 is a compression or compaction force that acts in the same direction as the first mechanical force F1 to press second structure 104 down onto first structure 102 to prevent porosity, and therefore expansion, of second structure 104. Although FIG. 3 illustrates a gap between second vacuum bag 108 and first vacuum bag 106, this is for illustration purposes only and, in operation, second vacuum bag 108 directly contacts first vacuum bag 106 to apply the second mechanical force F2 to second structure.

In the exemplary embodiment, first vacuum bag 106 and second vacuum bag 108 concurrently apply the first mechanical force F1 and second mechanical force F2, respectively, to second structure 104 for a predetermined amount of time. After the time duration has elapsed, the vacuum applied to first vacuum bag 106 is at least partially removed to vent the first volume 112 such that first volume 112 and second structure 104 are exposed to atmospheric pressure. As such, the first mechanical force F1 is at least partially removed from second structure 104. In some embodiments, first vacuum bag 106 is completely vented to atmospheric pressure. In other embodiments, a reduced vacuum is applied to first vacuum bag 106 to facilitate removing a plurality of volatile organic compounds from second structure 104.

The vacuum applied to second vacuum bag 108 is maintained after the vacuum applied to first vacuum bag 106 is removed. In such a configuration, maintaining the vacuum on second vacuum bag 108 maintains the second mechanical force F2 on second structure 104 while still exposing second structure 104 to atmospheric pressure within first volume 112. Accordingly, second vacuum bag 108 applies compaction pressure to prevent porosity in second structure 104. More specifically, by exposing the second structure 104 to atmospheric pressure during curing and maintaining the compaction force provided by the second vacuum bag 108, the volatile organic compounds formed during curing within at least the second structure 104 are kept in solution and are able to be removed from the second structure 104 without vaporizing, thus preventing porosity within the second structure 104.

Figure 4:
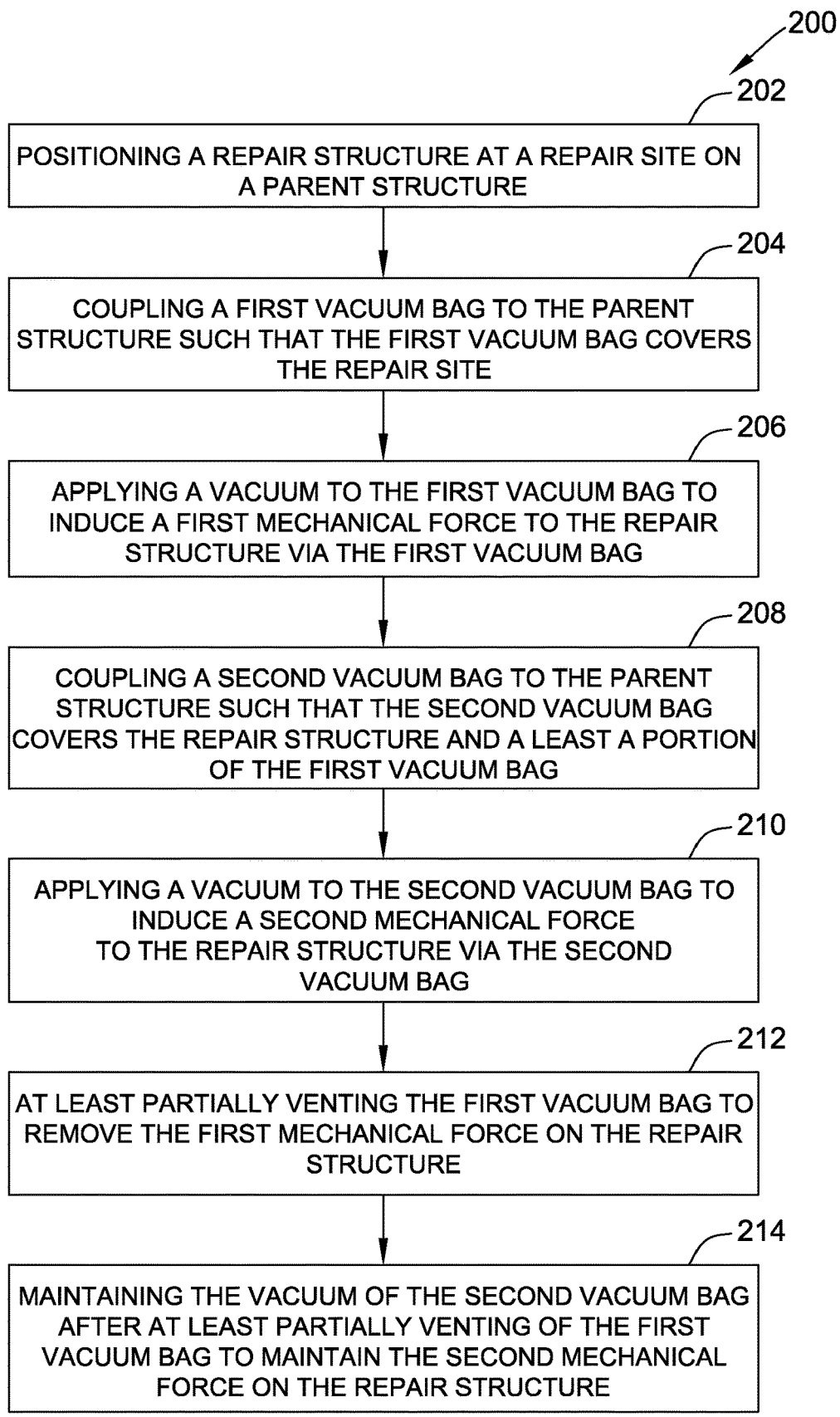
FIG. 4 illustrates a method for bonding a composite structure using the composite structure bonding system shown in FIGS. 2 and 3.

FIG. 4 illustrates a method 200 for bonding composite structures, such as first structure 102, using the composite structure bonding system 100 (shown in FIGS. 2 and 3). Method 200 includes positioning 202 positioning a second structure, such as second structure 104, at a bonding site, such as bonding site 110, on a first structure, such as first structure 102. Method 200 also includes coupling 204 a first vacuum bag, such as first vacuum bag 106, to the first structure such that the first vacuum bag covers the bonding site. The coupling step 204 includes sealing the first vacuum bag to the first structure with a first sealing mechanism, such as first sealing mechanism 114. As such, the first vacuum bag and first structure combine to define a first volume, such as first volume 112, which contains the second structure such that the first vacuum bag covers the second structure.

In the exemplary embodiment, once the first vacuum bag is coupled 204 to the first structure, a vacuum is applied 206 to the first vacuum bag to induce a first mechanical force, such as first mechanical force F1, to the second structure via the first vacuum bag. As described herein, the first mechanical force is a compacting force that compresses the second structure into or toward the first structure. The vacuum applying step 206 includes coupling a vacuum source, such as source 118, in flow communication with a first probe, such as first probe 116. The first probe couples the first volume in flow communication with the vacuum source to facilitate removing the air from within the first volume and inducing the first mechanical force onto the second structure.

Method 200 also includes coupling 208 a second vacuum bag, such as second vacuum bag 108, to the first structure and to a portion of the first vacuum bag such that the second vacuum bag covers the second structure and at least a portion of the first vacuum bag. The coupling step 208 includes sealing the second vacuum bag to the first structure with a second sealing mechanism, such as second sealing mechanism 124. Furthermore, the coupling step 208 includes coupling 208 the second vacuum bag to the first vacuum bag such that the first probe on the first vacuum bag is left uncovered by the second vacuum bag and remains exposed. As such, the second vacuum bag, first structure, and first vacuum bag combine to define a second volume, such as second volume 122. As described herein, the second vacuum bag covers an entirety of second structure. However, the second structure is located outside the second volume. More specifically, the second structure is separate from the second volume by the first vacuum bag. In the exemplary embodiment, the order in which the second vacuum bag is coupled 208 to the first structure and the vacuum is applied 206 to the first vacuum bag is interchangeable.

In the exemplary embodiment, once the second vacuum bag is coupled 208 to the first structure, a vacuum is applied 210 to the second vacuum bag to induce a second mechanical force, such as second mechanical force F2, to the second structure via the second vacuum bag. As described herein, the second mechanical force is a compacting force that compresses the second structure into or toward the first structure. The vacuum applying step 210 includes coupling the vacuum source, such as source 118, in flow communication with a second probe, such as second probe 126. The second probe couples the second volume in flow communication with the vacuum source to facilitate removing the air from within the second volume and inducing the second mechanical force onto the second structure.

As described herein, because the second vacuum bag covers the first vacuum bag as well as the second structure, the second mechanical force is also applied to the first vacuum bag. Additionally, the vacuum applying step 210 is performed only after the vacuum is applied 206 to the first vacuum bag such that a vacuum is applied to both vacuum bags concurrently to apply both mechanical forces to the second structure concurrently for a predetermine amount of time.

Method 200 also includes at least partially venting 212 the first vacuum bag to remove or withdraw the first mechanical force from the first vacuum bag on the second structure. The venting step 212 results in allowing air into the first volume of the first vacuum bag to expose the second structure to atmospheric pressure to facilitate removing a plurality of volatile organic compounds from the second structure while the volatiles are in solution. Furthermore, the venting step 212 is performed only after the vacuum has been applied 210 to the second vacuum bag. Method 200 also includes maintaining 214 the vacuum on the second vacuum bag after at least partially venting the first vacuum bag to maintain the second mechanical force on the second structure. As such, the first mechanical force is removed from the second structure when the first vacuum bag is at least partially vented 212. However, maintaining 214 the vacuum on the second vacuum bag after the vacuum applied to first vacuum bag is removed results in maintaining the second mechanical force on the second structure while still exposing the second structure to atmospheric pressure within the first volume. By exposing 212 the second structure to atmospheric pressure during curing and maintaining 214 the compaction force provided by the second bag, the volatile organic compounds formed during curing within at least the second structure are kept in solution and are removed from the second structure without vaporizing, thus preventing porosity within the second structure.

Optionally, method 200 may also include positioning a heating a blanket, such as heating blanket 128 under the first vacuum bag to cover the second structure. Additionally, method 200 may also include other steps not expressly described here for clarity. For example, such steps may include preparing the bonding site prior to positioning the second structure, curing the second structure and the first structure at the bonding site at a predetermined temperature for a predetermined time period, and performing any surface finishing at the bonding site as needed. Furthermore, each of the positioning 202, coupling 204, applying 206, coupling 208, applying 210, venting 212, and maintaining 214 steps are performed outside of an autoclave and are able to be performed directly on an aircraft on the flight line.

The composite structure bonding system described herein allows the use of atmospheric compaction pressure without the problems associated with low vapor pressure in traditional vacuum bag cures. More specifically, the composite structure bonding system described herein allows mechanical pressure to be applied to the second and first structures without exposing them to low vapor pressure. As such, porosity within the composite structures is significantly reduced or prevented, thus increasing or maintaining the structural integrity of the composite structures. More specifically, by exposing the second structure to atmospheric pressure during curing and maintaining the compaction force provided by the second bag, the volatile organic compounds formed during curing within at least the second structure are kept in solution and are able to be removed from the second structure without vaporizing, thus preventing porosity within the second structure.

Additionally, the composite structure bonding system described herein is designed to produce partially cured or fully cured autoclave-quality hot-bond composite repairs on a first structure without the use of an autoclave. As such, the composite structure bonding system described herein results in bonding of composite structures having any size and shape in a shortened time span and at a reduced cost as compared to known methods.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of bonding composite structures, said method comprising: positioning a second structure at a bonding site on a first structure; coupling a first vacuum bag to the first structure such that the first vacuum bag covers the bonding site; applying a vacuum to the first vacuum bag to induce a first mechanical force to the second structure via the first vacuum bag; coupling a second vacuum bag to the first structure and to the first vacuum bag such that the second vacuum bag covers the second structure and at least a portion of the first vacuum bag to define a second volume between the second vacuum bag, the first structure, and the first vacuum bag, wherein a centermost point of the second vacuum bag is capable of contacting the first vacuum bag; and applying a vacuum to the second vacuum bag to induce apply a second mechanical force to the second structure and to the first vacuum bag via the second vacuum bag; at least partially venting the first vacuum bag to remove at least a portion of the first mechanical force on the second structure; and maintaining the vacuum of the second vacuum bag after the at least partially venting of the first vacuum bag to maintain the second mechanical force on the second structure to bond the first structure to the second structure.

2. The method of claim 1, wherein the at least partially venting of the first vacuum bag comprises at least partially venting the first vacuum bag after applying the vacuum to the second vacuum bag.

3. The method of claim 1, wherein the at least partially venting of the first vacuum bag comprises exposing the second structure to atmospheric pressure.

4. The method of claim 1, wherein maintaining the vacuum on the second vacuum bag to maintain the second mechanical force comprises maintaining the vacuum on the second vacuum bag to maintain a compaction force on the first vacuum bag and on the second structure, and wherein the at least partially venting of the first vacuum bag comprises exposing the second structure to atmospheric pressure to facilitate removing a plurality of volatile organic compounds from the second structure.

5. The method of claim 1, wherein the coupling the first vacuum bag to the first structure comprises sealing the first vacuum bag to the first structure with a first sealing mechanism, and wherein the coupling the second vacuum bag to the first structure comprises sealing the second vacuum bag to the first structure with a second sealing mechanism.

6. The method of claim 1, wherein the coupling the second vacuum bag to cover at least the portion of the first vacuum bag comprises coupling the second vacuum bag to the first vacuum bag such that a first probe on the first vacuum bag is uncovered by the second vacuum bag.

7. The method of claim 1, further comprising positioning a heating blanket between the first vacuum bag and the second structure.

8. The method of claim 1, wherein applying the vacuum to the second vacuum bag comprises applying the vacuum to the second vacuum bag outside an autoclave.

9. A composite structure bonding system comprising:
a first structure comprising a bonding site;
a second structure configured to couple to said first structure at said bonding site;
a first vacuum bag coupled to said first structure, wherein said first vacuum bag is configured to apply a first mechanical force to said second structure when a vacuum is applied to first vacuum bag; and
a second vacuum bag coupled to both said first structure and said first vacuum bag such that the second vacuum bag covers the second structure, wherein a second volume is defined between said second vacuum bag, said first structure, and said first vacuum bag, wherein a centermost point of said second vacuum bag is capable of contacting said first vacuum bag such that said second vacuum bag is configured to apply a second mechanical force to said second structure and to said first vacuum bag when a vacuum is applied to second vacuum bag, wherein said second vacuum bag is configured to maintain the second mechanical force on said second structure and said first vacuum bag after said first vacuum bag is at least partially vented to the atmosphere.

10. The composite structure bonding system of claim 9, said first vacuum bag and said second vacuum bag are configured to apply the first mechanical force and the second mechanical force concurrently.

11. The composite structure bonding system of claim 9, wherein said second vacuum bag is configured to contact said first vacuum bag over an entire area of said second structure such that the second mechanical force is applied to said first vacuum bag and to the entire area of said second structure through said first bag.

12. The composite structure bonding system of claim 9, further comprising a heating blanket positioned between said first vacuum bag and said second structure.

13. The composite structure bonding system of claim 9, wherein said first vacuum bag defines a first volume between said first vacuum bag and said first structure, wherein said second structure is positioned within said first volume.

14. The composite structure bonding system of claim 13, further comprising a first probe coupled to said first vacuum bag, wherein said first probe selectively couples said first volume in flow communication with a vacuum source.

15. The composite structure bonding system of claim 14, wherein said second structure is positioned outside said second volume between said first vacuum bag and said first structure.

16. The composite structure bonding system of claim 15, wherein said first probe is positioned outside said second volume when said second vacuum bag is coupled to said first vacuum bag.

17. The composite structure bonding system of claim 15, further comprising a second probe coupled to said second vacuum bag, wherein said second probe selectively couples said second volume in flow communication with a vacuum source.

18. The composite structure bonding system of claim 9, wherein said first vacuum bag is coupled to said first structure with a first sealing mechanism, and wherein said second vacuum bag is coupled to said first structure with a second sealing mechanism.

19. The method of claim 1, wherein the first vacuum bag and the second vacuum bag are configured to apply the first mechanical force and the second mechanical force concurrently.

20. The method of claim 1, wherein the second vacuum bag is configured to contact the first vacuum bag over an entire area of the second structure such that the second mechanical force is applied to the first vacuum bag and to the entire area of the second structure through the first bag.

* * * * *